US006568583B2

(12) United States Patent
Yumi et al.

(10) Patent No.: US 6,568,583 B2
(45) Date of Patent: May 27, 2003

(54) CONDUCTIVE ELEMENT AND MANUFACTURING METHOD THEREOF

(75) Inventors: Hideo Yumi, Nagoya (JP); Masaru Yagi, Nagoya (JP)

(73) Assignee: Kitagawa Industries Co., Ltd., Nagoya (JP)

( * ) Notice: Subject to any disclaimer, the term of this patent is extended or adjusted under 35 U.S.C. 154(b) by 0 days.

(21) Appl. No.: 09/792,942

(22) Filed: Feb. 26, 2001

(65) Prior Publication Data

US 2001/0027991 A1 Oct. 11, 2001

(30) Foreign Application Priority Data

Apr. 5, 2000 (JP) ....................................... 2000-103534

(51) Int. Cl.[7] .......................... B23K 31/02; B32B 15/06

(52) U.S. Cl. ................................ 228/180.5; 228/173.5; 174/117 F; 174/117 FF; 428/626

(58) Field of Search ............................ 228/180.5, 56.3, 228/248, 164, 173.1, 173.5; 174/117 F, 117 FF, 261; 428/607, 626

(56) References Cited

U.S. PATENT DOCUMENTS 4,067,105 A * 1/1978 Zahn et al. ................... 29/869
4,664,459 A * 5/1987 Flanagan et al. ........... 439/502
5,248,262 A * 9/1993 Busacco et al. .............. 439/66
5,371,654 A * 12/1994 Beaman et al. ............. 361/744
5,618,189 A * 4/1997 Jin et al. ....................... 439/91
5,840,417 A * 11/1998 Bolger ....................... 428/323
6,168,974 B1 * 1/2001 Chang et al. ............... 438/109
6,224,396 B1 * 5/2001 Chan et al. ................... 439/71
6,264,476 B1 * 7/2001 Li et al. ........................ 439/66
6,475,640 B1 * 11/2002 Doujak et al. .............. 428/626

FOREIGN PATENT DOCUMENTS

JP 08-287980 11/1996 ............ H01R/9/09

* cited by examiner

*Primary Examiner*—M. Alexandra Elve
*Assistant Examiner*—Len Tran
(74) *Attorney, Agent, or Firm*—Davis & Bujold, P.L.L.C.

(57) ABSTRACT

A conductive element having good solderability and the manufacturing method thereof. A metal wire having a circular section and tin-plated along its whole circumference is prepared and pressed by a pressing machine from the side directions until the metal wire becomes almost flat. By this, a strip of thin plate-like member is formed. Then, a conductive silicone base adhesive is applied to one surface (one pressed surface) of the plate-like member and dried. Thus, the conductive element comprising the plate-like member and the conductive elastomer joined to the pressed surface thereof is obtained.

19 Claims, 9 Drawing Sheets

CONDUCTIVE ELEMENT AND MANUFACTURING METHOD THEREOF

FIELD OF THE INVENTION

The present invention relates to a conductive element to be surface mounted on a printed circuit board by soldering, for example, so as to ground the printed circuit board to a grounding conductor by pressing its elastically deformable contact part against the grounding conductor, and to the manufacturing method thereof.

BACKGROUND OF THE INVENTION

Presently, there is a known conductive element to be surface mounted on a printed circuit board to ground the printed circuit board by being pressed against a grounding conductor such as a housing panel. For example, Publication of Japanese Unexamined Patent Application No. 8-287980 discloses a grounding terminal (hereinafter referred to as a conductive element) of this type.

As shown in FIG. 9A, a conductive element P1 of this type is reflow soldered to a conductive pattern P3 on a printed circuit board P2 with solder P4. When the conductive element P1 is pressed against a grounding conductor P5, the printed circuit board P2 is grounded.

The conductive element P1 is formed by bending a narrow, thin metal sheet (a metal strip) to have a base P6 and a contact part P7 therein. One surface of the base P6 is a joining surface P8 to be soldered to the conductive pattern P3 on the printed circuit board P2. The contact part P7 adjoins the base 6 and is bent toward the upper direction.

As the result of load by the grounding conductor P5, the contact part P7 is elastically deformed around the bending area bordering the base 6 and is pressed against the grounding conductor P5 by restoring force caused by the elastic deformation, thereby electrically connecting the printed circuit board P2 and the grounding conductor P5 properly.

Recently, there have been studies of a conductive element in which the above mentioned metal strip and a conductive elastomer are joined integrally by applying a conductive elastomeric adhesive to one surface of the metal strip so as to obtain greater elasticity.

However, manufacturing such a conductive element with a joined conductive elastomer involves the following problem:

The metal strip as a blank for the aforementioned conductive element is typically formed by cutting a large rectangular or square metal sheet into strips. The surfaces of the large metal sheet are generally plated with nickel or the like having great joinability with solder so as to increase solderability.

However, once the large metal sheet as mentioned above is cut, its section (cut surface) P11 naturally provides a non-plated, bare metal, as shown in FIG. 9B.

Accordingly, when the conductive element is soldered, it is difficult for solder to attach the cut surface P11 of the metal strip and solderability of the metal strip is decreased, with the result that the joining strength of the conductive element is decreased.

A solution to this problem is to provide an additional step of plating the cut surface P11, but it is difficult to plate such a narrow part as the cut surface P11. Moreover, this solution leads to an increase of the manufacturing cost as well as the manufacturing steps.

SUMMARY OF THE INVENTION

Wherefore, an object of the invention is to provide a conductive element realizing high solderability and a manufacturing method thereof, which overcome the aforementioned problem.

According to one aspect of the invention, there is provided a conductive element to be soldered to a supporting element for ensuring conduction (for example, between a printed circuit board to be joined to and a grounding conductor), the conductive element comprising: a plate-like member formed by pressing a metal wire having a surface plated with a solderabe metal; and a conductive elastomer joined to a pressed surface of the plate-like member.

The method of manufacturing the conductive element comprises the steps of: plating a surface of a metal wire with a solderable metal; pressing the metal wire having a surface plated with a solderable metal from a side direction to form a plate-like member having a pressed surface; and attaching a conductive elastomer to the pressed surface of the plate-like member to form the conductive element.

In the present aspect, a metal wire with a plated surface is pressed to form a thin plate-like member and a conductive elastomer is joined to the pressed surface. Since the metal wire is plated along its whole circumference with a metal having great solderability such as nickel, after the metal wire is pressed, even the narrow sides of the plate-like member (i.e. the sides perpendicular to the pressed surfaces) also have plated surfaces. That is, unlike a conventional metal strip, the present plate-like member does not provide any non-plated surfaces.

Accordingly, when the conductive element is soldered to a printed circuit board, solder is spread over the narrow side surfaces of the plate-like member, and therefore the conductive element and the printed circuit board can be joined firmly.

Also, since separate plating of the conventionally non-plated side surfaces of the plate-like member is not necessary, the whole manufacturing process is simplified and cost reduction is achieved.

It is preferable that the conductive element in the above aspect of the invention has concavities and convexities in the pressed surface of the plate-like member, and that the manufacturing method thereof includes forming the concavities and convexities during the press operation. These concavities and convexities formed, for example, in the axial direction in the pressed surface of the plate-like member, improve joinability with the conductive elastomer.

According to another aspect of the invention, there is provided a conductive element comprising: a plate-like member formed by pressing a bundle of a plurality of metal wires each metal wire having a surface plated with a solderable metal; and a conductive elastomer joined to a pressed surface of the plate-like member.

The method of manufacturing the conductive element comprises the steps of: binding a plurality of metal wires each having a surface plated with a solderable metal; pressing the bound plurality of metal wires from a side direction thereof to form a plate-like member having a pressed surface; and attaching a conductive elastomer to the pressed surface of the plate-like member to form the conductive element.

In the present aspect, since a plurality of metal wires are bound and pressed together, even the narrow sides of the plate-like member have plated surfaces. This improves joining strength when soldered and achieves cost reduction.

Particularly, in the present aspect, a plurality of metal wires which are bound and pressed together necessarily provide irregularity both in the pressed surfaces and in the narrow side surfaces of the plate-like member. This irregularity provides the advantage of improving joinability with conductive elastomers and solderability as well.

According to a further aspect of the invention, there is provided a method of manufacturing a conductive element as in the above aspects of the invention, further comprising the step of mounting the conductive element to a surface of a printed circuit board by soldering in order to ground the printed circuit board to a grounding conductor by contacting an elastically deformable contact part of the conductive element on the grounding conductor.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

First Embodiment a) The structure of a conductive element according to a first embodiment will now be described.

Figure 1:
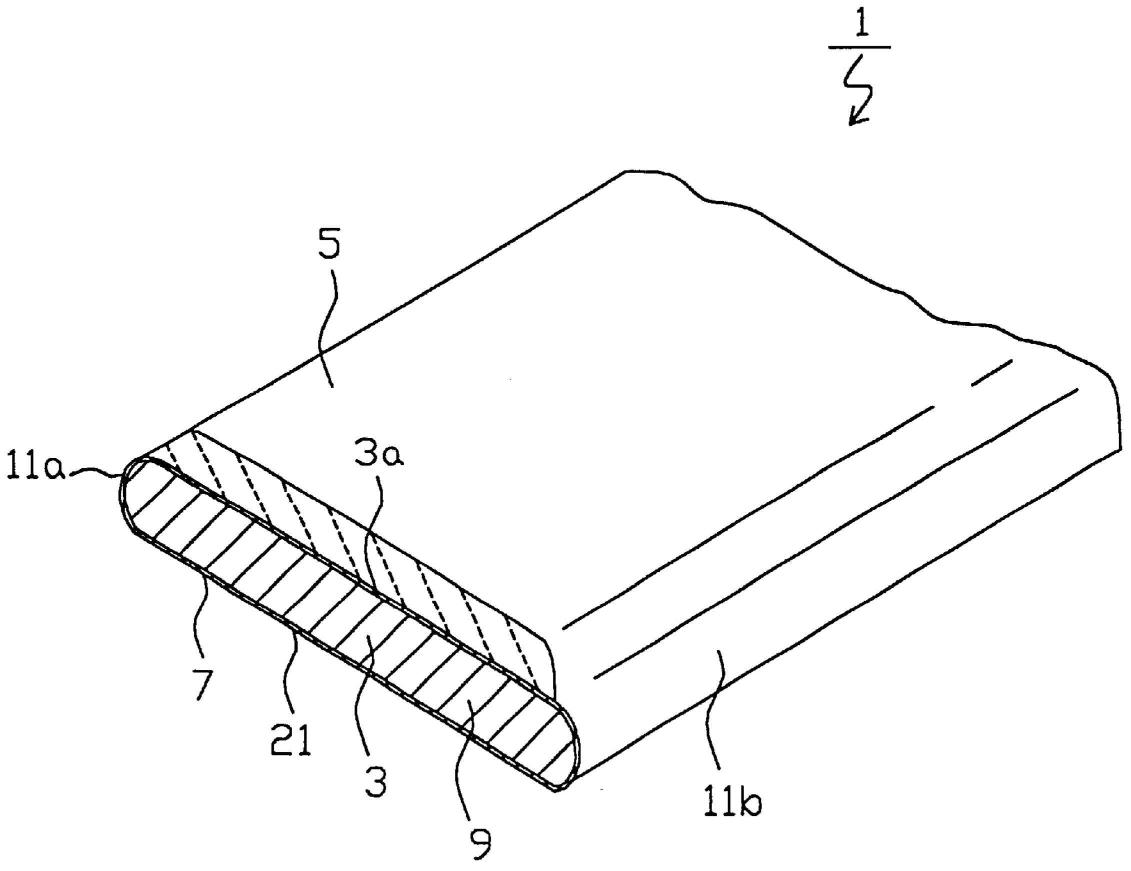
FIG. 1 is a perspective view showing a conductive element according to a first embodiment of the invention.

FIG. 1 shows a conductive element 1 of the present embodiment, which has conductivity as well as elasticity and comprises a plate-like member 3 having the sectional dimensions of about 0.8–1 mm×about 0.3–0.5 mm and a conductive elastomer 5 joined to one surface 3*a* (the upper pressed surface in the present figure) of the plate-like member 3.

The plate-like member 3 is made by pressing a metal wire 9 of copper having a surface covered with a plated layer 7 of tin from the side directions (the upper and lower directions in the present figure) to form a thin plate.

The conductive elastomer 5 is formed by applying a conductive silicone base adhesive to the pressed surface 3*a* of the plate-like member 3.

b) The manufacturing method of the conductive element 1 according to the present embodiment will now be described with reference to FIGS. 2A to 2C.

Figure 2A:
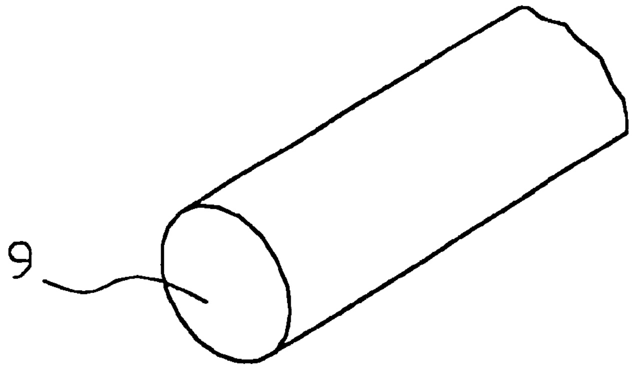
FIGS. 2A, 2B and 2C are explanatory views showing a manufacturing method of the conductive element according to the first embodiment.

As shown in FIG. 2A, a metal wire 9 having a circular section (0.5–0.8 mm in diameter) and tin-plated along its whole circumference is prepared.

Figure 2B:
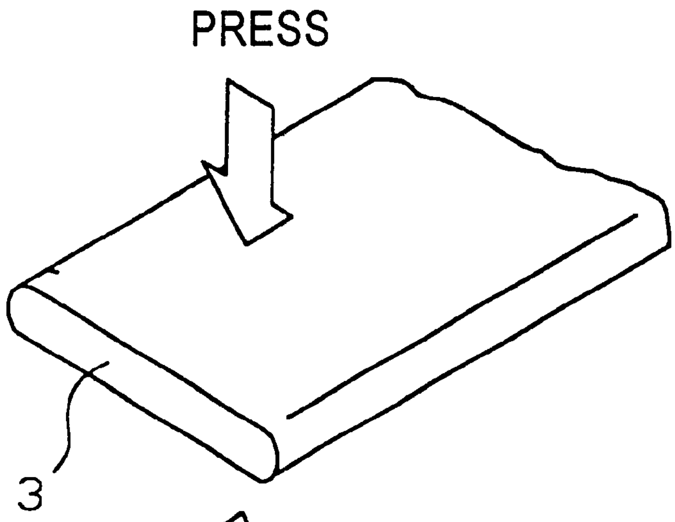

As shown in FIG. 2B, the metal wire 9 is pressed from the side directions (the upper and lower directions in the present figure) using a known pressing machine until the metal wire 9 having a circular section becomes an almost flat plate with a thickness of 0.3–0.5 mm. A strip of thin plate-like member 3 mentioned above is thus formed.

Figure 2C:
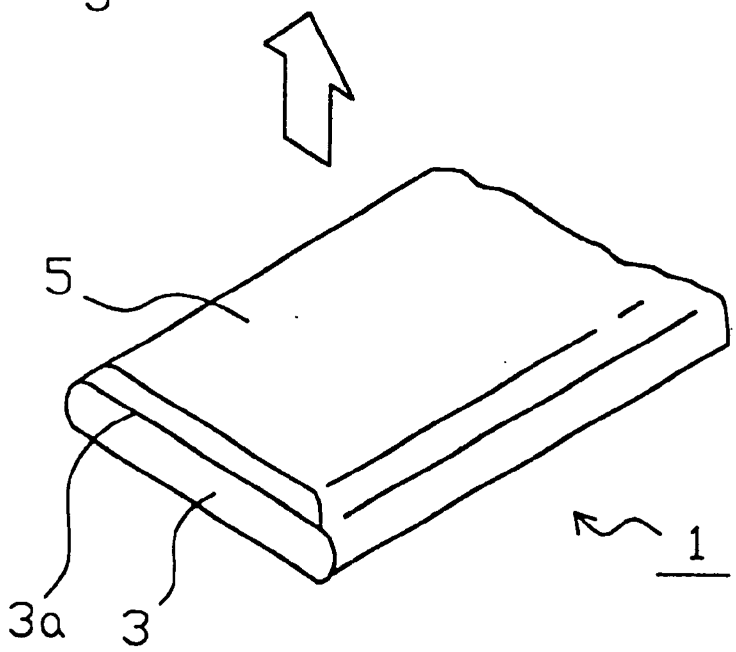

Subsequently, as shown in FIG. 2C, a conductive silicone base adhesive is applied to one surface (a first surface) 3*a* of the plate-like member 3 and is dried. Thus, the conductive element 1 comprising the plate-like member 3 and the conductive elastomer 5 joined to the first surface (i.e. the pressed surface) 3*a* of the plate-like member 3 is completed. The conductive element 1 is then processed into a desired shape.

In the present embodiment, as described above, the conductive element 1 is obtained by firstly forming the thin plate-like member 3 by pressing the metal wire 9 with a tin-plated surface and secondly joining the conductive elastomer 5 to the pressed surface 3*a* of the plate-like member 3. Therefore, as shown in FIG. 1, even both narrow side surfaces 11*a* and 11*b* of the plate-like member 3 are covered with a plated layer 7 having good joinability with solder. As a result, when the conductive element 1 is soldered to a printed circuit board (not shown), solder is spread over the side surfaces 11*a* and 11*b* as well as the bottom surface 21 of the plate-like member 3, and the conductive element 1 and the printed circuit board can be joined firmly.

Also, as the side surfaces 11*a* and 11*b* of the plate-like member 3 already have the plated layer 7, separate plating step is not necessary, which simplifies the whole manufacturing process of the conductive element 1 and therefore realizes cost reduction.

Second Embodiment a) The structure of a second embodiment will now be described.

Figure 3:
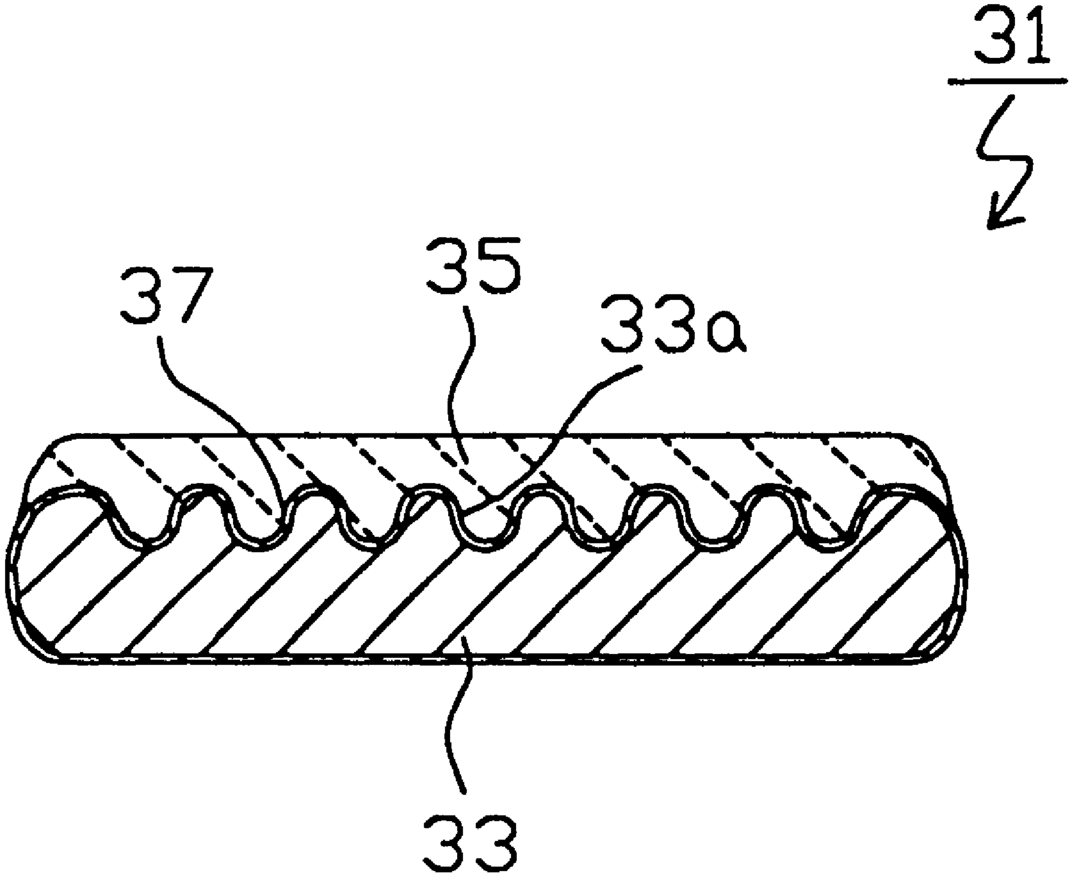
FIG. 3 is a sectional view of a conductive element according to a second embodiment of the invention.

As shown in FIG. 3, a conductive element 31 of the present embodiment comprises an almost flat plate-like member 33 having one surface (the upper surface in the figure or the pressed surface) 33*a* to which a conductive elastomer 35 is joined in the same manner as in the first embodiment.

In the present embodiment, a plurality of concavities and convexities (a plurality of grooves) 37 are formed in the pressed surface 33*a* of the plate-like member 33 along the axial direction of the plate-like member 33 (in the direction perpendicular to the surface of the paper on which the present figure is presented).

b) The manufacturing method of the conductive element 31 according to the present embodiment will now be described.

Figure 4A:
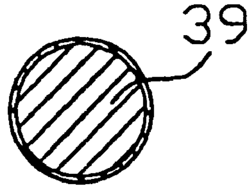
FIGS. 4A, 4B and 4C are explanatory views showing a manufacturing method of the conductive element according to the second embodiment.

As shown in FIG. 4A, a metal wire 39 having a circular section and tin-plated along its whole circumference is prepared.

Figure 4B:
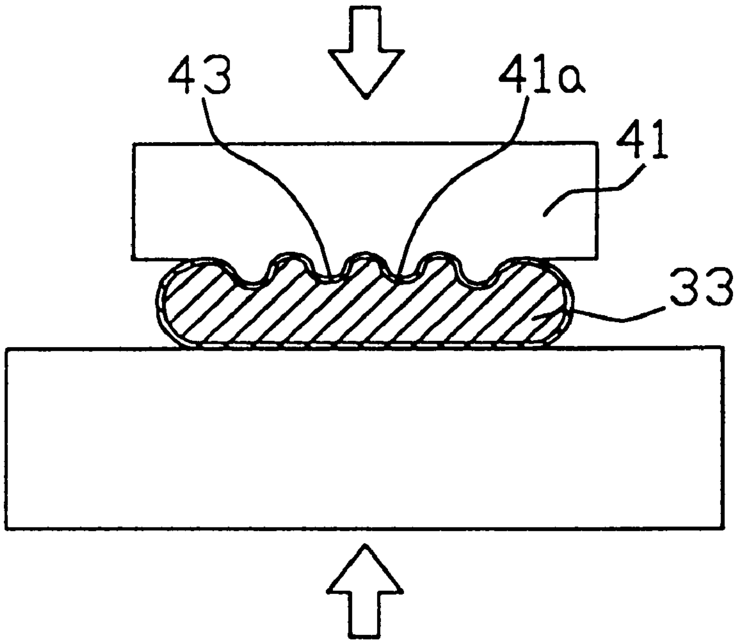

As shown in FIG. 4B, the metal wire 39 is pressed from the side directions (the upper and lower directions in the present figure) using a known pressing machine until the metal wire 39 having a circular section becomes an almost flat plate with a predetermined thickness.

Since the press surface 41*a* of the upper press member 41 is provided with concavities and convexities 43 corresponding to concavities and convexities 37 which are to be formed in the pressed surface 33*a* of the plate-like member 33, the concavities and convexities 37 are formed in the pressed surface 33*a* of the plate-like member 33 during this press operation.

Figure 4C:
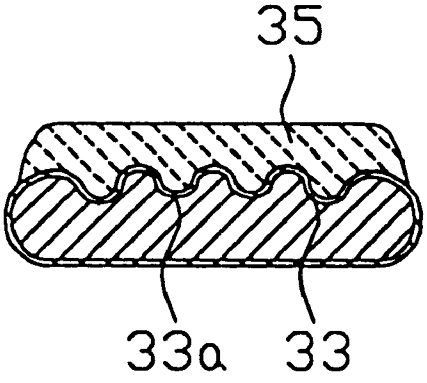

Subsequently, as shown in FIG. 4C, a conductive silicone base adhesive is applied to the pressed surface 33*a* of the plate-like member 33 and is dried. Thus, the conductive element 31 comprising a plate-like member 33 and a conductive elastomer 35 joined to the pressed surface 33*a* of the plate-like member is completed.

The present embodiment provides, in addition to the same effects as in the first embodiment, the advantage that the plate-like member 33 and the conductive elastomer 35 are joined closely because the concavities and convexities 37 are formed in the pressed surface 33*a* of the plate-like member 33.

Third Embodiment a) The structure of a third embodiment will now be described.

Figure 5:
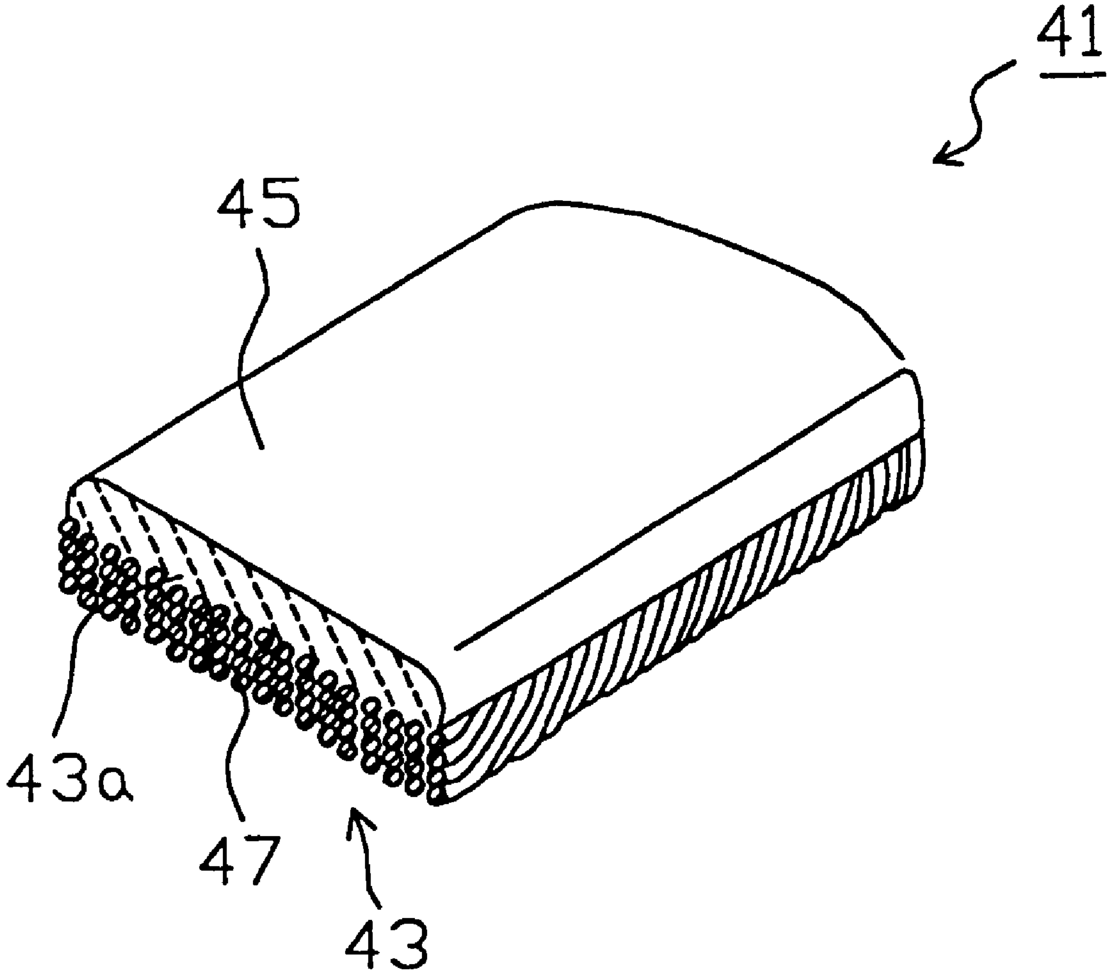
FIG. 5 is a perspective view showing a conductive element according to a third embodiment of the invention.

As shown in FIG. 5, a conductive element 41 of the present embodiment comprises an almost flat plate-like member 43 having one surface (the upper surface in the figure or a pressed surface) 43*a* to which a conductive elastomer 45 is joined in the same manner as in the first embodiment.

In the present embodiment, the plate-like member 43 is formed by binding a plurality of metal wires 47 as used in the first embodiment (i.e. having a plated layer) then slightly twisting and pressing the same.

b) The manufacturing method of the conductive element 41 according to the present embodiment will now be described.

Figure 6A:
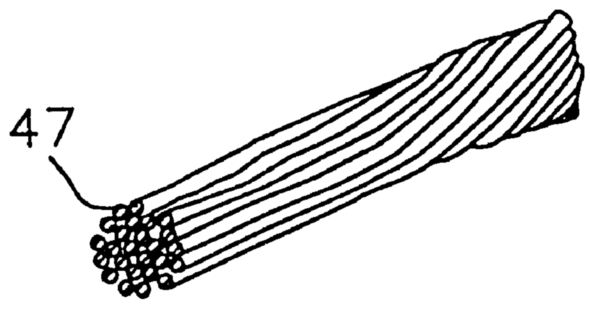
FIGS. 6A, 6B and 6C are explanatory views showing a manufacturing method of the conductive element according to the third embodiment.

As shown in FIG. 6A, a plurality of metal wires 47 each having a circular section (0.1–0.2 mm in diameter) and tin-plated along its whole circumference are bound and slightly twisted to prevent from getting loose.

Figure 6B:
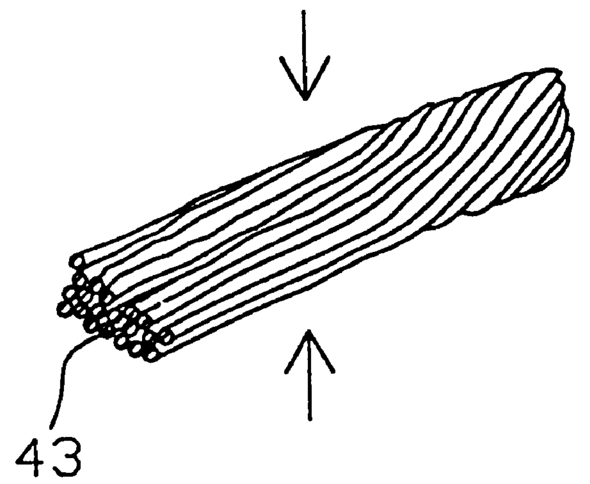

Then, as shown in FIG. 6B, the bundle of metal wires 47 are pressed from the side directions (the upper and lower directions in the present figure) using a known pressing machine until the bundle of metal wires 47 become an almost flat plate with a predetermined thickness. The above plate-like member 43 comprising a plurality of metal wires 47 is thus formed.

Figure 6C:
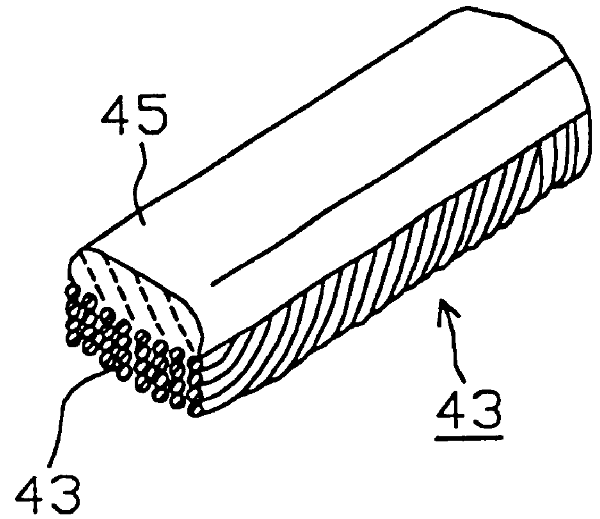

Subsequently, as shown in FIG. 6C, a conductive silicone base adhesive is applied to the pressed surface 43*a* of the plate-like member 43 and is dried. Thus, the conductive element 41 comprising the plate-like member 43 and the conductive elastomer 45 joined to the pressed surface 43*a* of the plate-like member 43 is completed.

Since the plate-like member 43 in the present embodiment comprises a plurality of metal wires 47, the surface thereof has irregularity formed along the metal wires. Therefore, the present embodiment provides advantages that the plate-like member 43 and the conductive elastomer 45 are closely joined and that the plate-like member 43 and solder are also closely joined, in addition to the same effects as in the first embodiment.

Fourth Embodiment

Figure 7A:
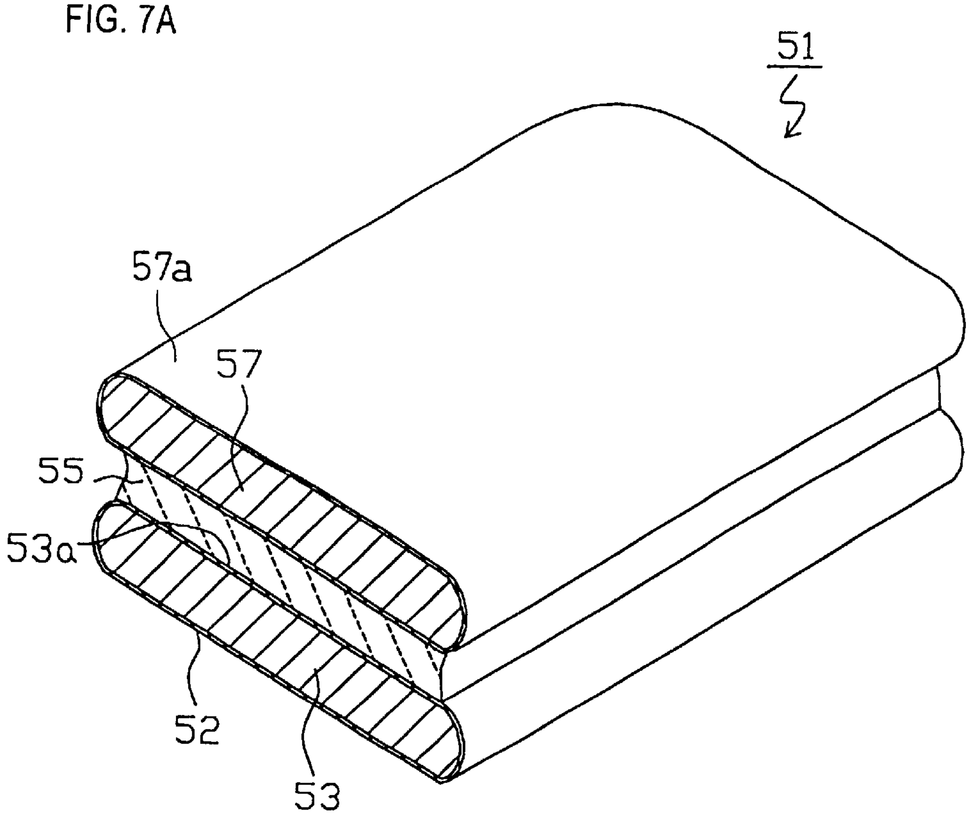
FIGS. 7A and 7B are perspective views showing a conductive element according to a fourth embodiment of the invention and its modification.

As shown in FIG. 7A, a conductive element 51 of the present embodiment comprises a plate-like member 53 with a plated layer 52, a conductive elastomer 55 joined to one surface, i.e. the pressed surface 53*a* (the upper surface in the present figure) formed by pressing a metal wire in the same manner as in the first embodiment, and another plate-like member (the upper plate-like member) 57 joined onto the conductive elastomer 55.

As the upper plate-like member 57, the same plate-like member as in the first embodiment (with a plated layer 57*a*) may be employed. The plated layer 57*a* is preferably provided, but is not always necessary. Both or either of the plate-like member 53 and the upper plate-like member 57 may be made of a plurality of metal wires the same as the plate-like member in the third embodiment.

In the manufacturing method of the conductive element 51 according to the present embodiment, when the conductive elastomer 55 is joined to the plate-like member 53 (or the upper plat-like member 57), the upper plate-like member 57 (or the plate-like member 53) can be joined at the same time.

Since the conductive element 51 of the present embodiment has a structure that the upper plate-like member 57 is joined to the conductive elastomer 55 which is joined to the plate-like member 53, it is suitable for use when the surface of the opposite member abutting the upper plate-like member 57 is hard.

Figure 7B:
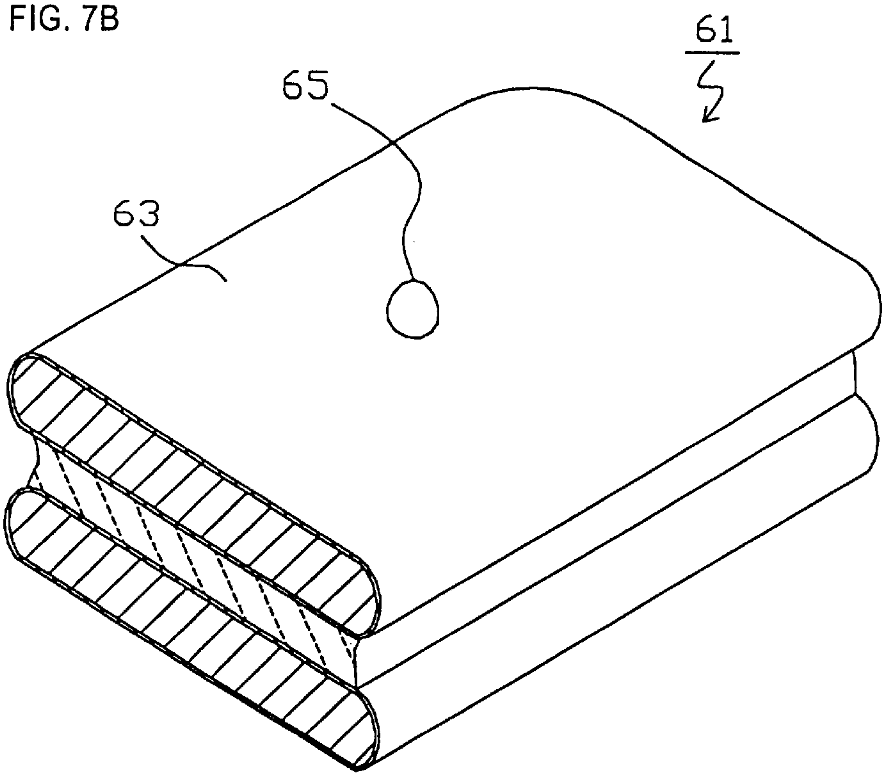

A conductive element 61 having a point projection 65 on the upper plate-like member 63, as shown in FIG. 7B, is an application of the present embodiment.

Fifth Embodiment

Figure 8A:
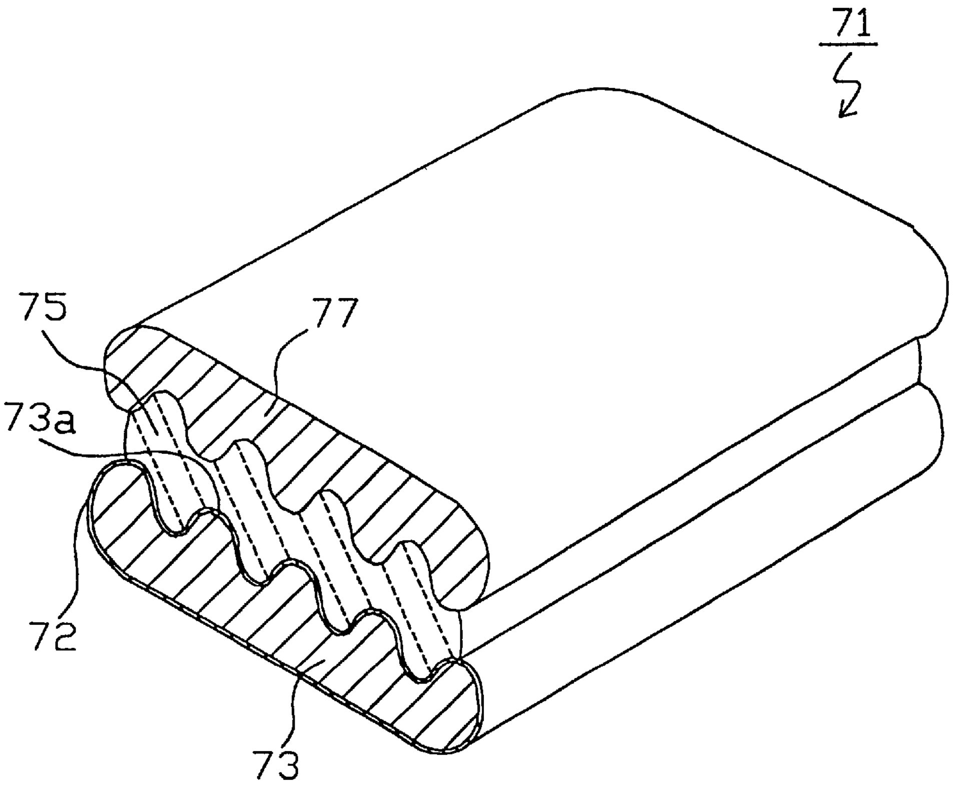
FIGS. 8A and 8B are explanatory views showing a conductive element according to a fifth embodiment of the invention and its modification.

As shown in FIG. 8A, a conductive element 71 of the present embodiment comprises a plate-like member 73 having a plated layer 72 and one pressed surface 73*a* with concavities and convexities (the upper surface in the figure) formed by pressing a metal wire in the same manner as in the second embodiment, a conductive elastomer 75 joined to the pressed surface 73*a* in the same manner as in the second embodiment, and another plate-like member (the upper plate-like member) 77 having concavities and convexities additionally joined to the conductive elastomer 75.

As the upper plate-like member 77, the same plate-like member with concavities and convexities as in the second embodiment may be employed. A plated layer on the plate-like member is preferably provided, but is not always necessary. Both or either of the plate-like member 73 and the upper plate-like member 77 may be made of a plurality of metal wires like the plate-like member in the third embodiment.

In the manufacturing method of the conductive element 71 according to the present embodiment, when the conductive elastomer 75 is joined to the plate-like member 73 (or the upper plat-like member 77), the upper plate-like member 77 (or the plate-like member 73) can be joined at the same time.

Since the conductive element 71 of the present embodiment has a structure that the upper plate-like member 77 is additionally joined to the conductive elastomer 75 which is joined to the plate-like member 73, it is suitable for use when the surface of the opposite member abutting the upper plate-like member 77 is hard.

Figure 8B:
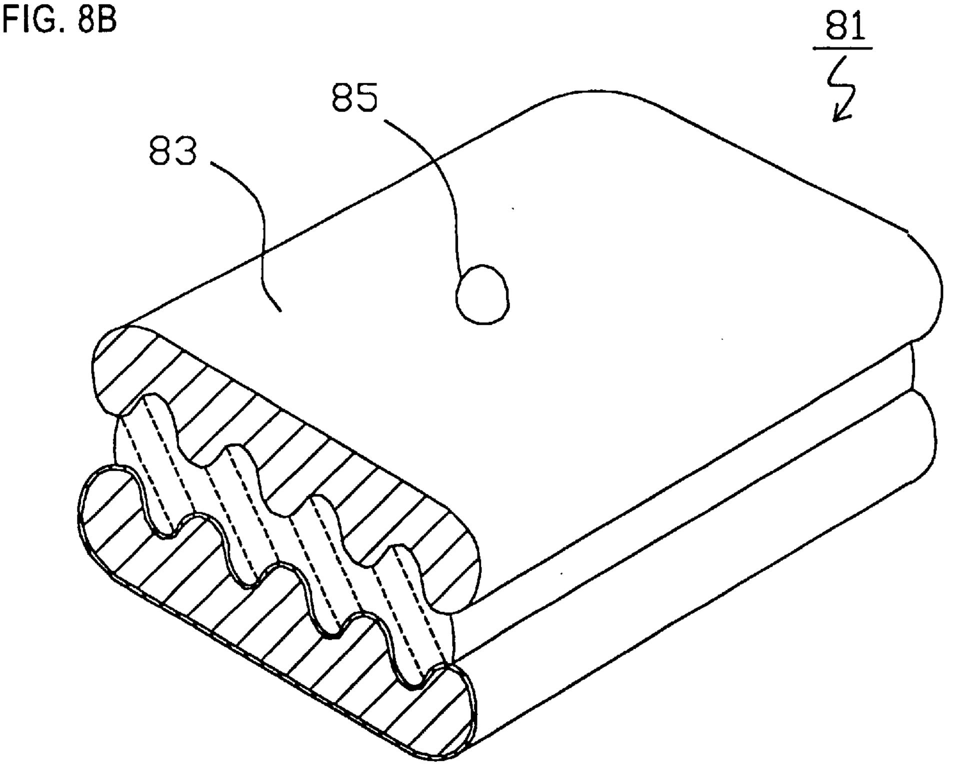
Figure 9A:
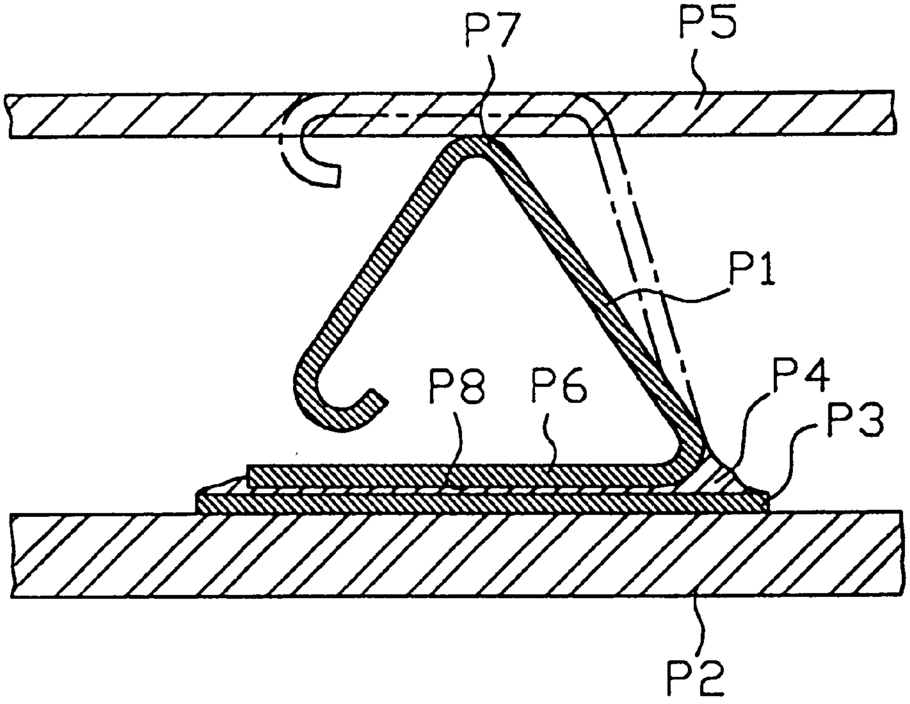
FIG. 9A PRIOR ART
FIGS. 9A and 9B are explanatory views of the prior art.
Figure 9B:
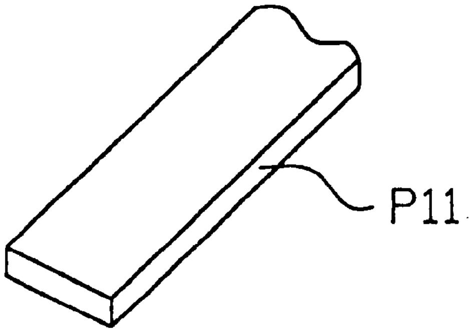
FIG. 9B PRIOR ART

A conductive element 81 having a point projection 85 on the upper plate-like member 83, as shown in FIG. 8B, is an application of the present embodiment.

The material for the above-mentioned metal wire may be copper, copper alloys, gold, silver, etc. The cross section of the metal wire is typically circular but may be in other shapes, such as square or rectangular.

The metals to be used to plate the metal wire and having good solderability are nickel, tin, gold, silver, etc.

As the conductive elastomer, which is a material having conductivity and elasticity, conductive adhesives such as a conductive silicone base adhesive may be employed as well as a separate conductive elastomer joined with such a conductive adhesive. For example, a sheet-like conductive elastomer may be joined with a conductive silicone base adhesive.

Examples of the conductive elastomer to be joined with a conductive adhesive are elastic rubbers such as silicone rubber and polymer foams such as chloroprene, neoprene, Santoprene, polyurethane with fine particles of silver, copper, aluminum, nickel, carbon, graphite, etc. mixed therein. Furthermore, elastic rubbers or foams covered with metal foils or metal nets, and elastic rubbers or foams coated with metallic materials may be employed depending on the situation of use.

An exemplary method of joining the conductive elastomer is applying a liquid type conductive elastomer (e.g. a conductive silicone base adhesive) to the pressed surface of the plate-like member and then drying the same.

The above described concavities and convexities formed in the pressed surface may be defined by multiple grooves extending along the axial direction of the metal wire or dotting recesses over the pressed surface.

Although the present invention has been described in connection with the preferred embodiments, it is to be understood that this is done only by way of example, and not as a limitation to the scope of the invention, which should be determined with reference to the claims.

What is claimed is:

1. A conductive element for attachment to a support member by soldering to provide electrical conductivity between the conductive element and the support member, the conductive element comprising:

a metal wire plated with a solderable metal, the plated metal wire being deformed, following plating with the solderable metal, into a substantially planar member having opposed substantially planar surfaces plated with the solderable metal; and one of the opposed substantially planar surfaces plated with the solderable metal supporting a conductive elastomer, the conductive elastomer facilitating support of a desired component and the conductive elastomer being compressible to allowing limited relative movement between a supported desired component and the substantially planar member.

2. The conductive element according to claim 1, wherein the substantially planar surface which supports the conductive elastomer has a series of undulations formed therein for increasing a contacting surface area between the substantially planar member and the conductive elastomer.

3. The conductive element according to claim 1, wherein the solderable metal is one of nickel or tin.

4. The conductive element according to claim 1, wherein the deformed substantially planar member has a substantially rectangular transverse cross section with a width of between about 0.8 to 1.0 mm and a thickness between about 0.3 to 0.5 mm.

5. The conductive element according to claim 4, wherein the substantially planar surface which supports the conductive elastomer has a series of undulations formed therein for increasing a contacting surface area between the substantially planar member and the conductive elastomer, and the series of undulations extend along a longitudinal axis of the conductive element.

6. The conductive element according to claim 1, wherein the deformed plated metal wire has opposed substantially planar top and bottom surfaces and opposed slightly rounded side surfaces which result in a substantially rectangular transverse cross section for the conductive element, and the conductive element has a width of between about 0.8 to 1.0 mm and a thickness between about 0.3 to 0.5 mm.

7. The conductive element according to claim 2, wherein the series of undulations comprises a series of elongate peaks and elongate valleys which extend along a longitudinal axis of the conductive element.

8. The conductive element according to claim 7, wherein between four and seven elongate peaks and elongate valleys are formed in one of the opposed substantially planar surfaces.

9. The conductive element according to claim 1, wherein the metal wire, plated with a solderable metal, comprises a plurality of metal wires bundled together to form the metal wire.

10. The conductive element according to claim 1, wherein the metal wire, plated with a solderable metal, comprises a plurality of metal wires twisted together to form the metal wire.

11. The conductive element according to claim 1, wherein the metal wire, plated with a solderable metal, is a solid metal wire.

12. A conductive element for attachment to a support member by soldering to provide electrical conductivity between the conductive element and the support member, the conductive element comprising:

a first metal wire plated with a solderable metal, the first plated metal wire being deformed, following plating with the solderable metal, into a first substantially planar member having opposed substantially planar surfaces plated with the solderable metal;

a second metal wire plated with a solderable metal, the second plated metal wire being deformed, following plating with the solderable metal, into a second substantially planar member having opposed substantially planar surfaces plated with the solderable metal; and a conductive elastomer being sandwiched between one of the opposed substantially planar surfaces of the first substantially planar member and one of the opposed substantially planar surfaces of the second substantially planar member to form the conductive element.

13. The conductive element according to claim 12, wherein the solderable metal is one of nickel or tin.

14. The conductive element according to claim 12, wherein the first and second deformed substantially planar members each have a substantially rectangular transverse cross section with a width of between about 0.8 to 1.0 mm and a thickness between about 0.3 to 0.5 mm.

15. The conductive element according to claim 14, wherein opposed facing surfaces of the first and second deformed substantially planar members each have a series of undulations formed therein for increasing a contacting surface area between the first and second deformed substantially planar members and the conductive elastomer, and both series of undulations extend along a longitudinal axis of the conductive element.

16. The conductive element according to claim 11, wherein the first and second deformed substantially planar members each have opposed substantially planar top and bottom surfaces and opposed slightly rounded side surfaces which result in a substantially rectangular transverse cross section for the first and second deformed substantially planar members, and each of the first and second deformed substantially planar members has a width of between about 0.8 to 1.0 mm and a thickness between about 0.3 to 0.5 mm.

17. The conductive element according to claim 13, wherein the series of undulations comprises a series of elongate peaks and elongate valleys which extend along a longitudinal axis of the conductive element.

18. The conductive element according to claim 17, wherein between four and seven elongate peaks and elongate valleys are formed in one of the opposed substantially planar surfaces.

19. The conductive element according to claim 12, wherein the metal wire, plated with a solderable metal, is a solid metal wire.

* * * * *